(12) United States Patent
Yamaji et al.

(10) Patent No.: US 6,868,867 B2
(45) Date of Patent: Mar. 22, 2005

(54) FLUID CONTROL APPARATUS

(75) Inventors: Michio Yamaji, Osaka (JP); Kenji Tsubota, Osaka (JP); Hidenaga Hoshiyama, Osaka (JP)

(73) Assignee: Fujikin Incorporated, Osaka (JP)

( * ) Notice: Subject to any disclaimer, the term of this patent is extended or adjusted under 35 U.S.C. 154(b) by 58 days.

(21) Appl. No.: 10/151,312

(22) Filed: May 21, 2002

(65) Prior Publication Data

US 2002/0185185 A1 Dec. 12, 2002

(30) Foreign Application Priority Data

May 23, 2001 (JP) ........................................ 2001-154359

(51) Int. Cl.[7] ............................................. F16K 11/10
(52) U.S. Cl. ...................................................... 137/884
(58) Field of Search .............................. 137/269, 271, 137/884

(56) References Cited

U.S. PATENT DOCUMENTS

| 5,819,782 | A | * | 10/1998 | Itafuji ........................ 137/240 |
| 6,068,016 | A | * | 5/2000 | Manofsky, Jr. et al. ...... 137/269 |
| 6,109,303 | A | | 8/2000 | Itafuji et al. ................. 137/884 |
| 6,142,164 | A | * | 11/2000 | Wier et al. ................. 137/15.04 |
| 6,152,175 | A | * | 11/2000 | Itoh et al. ................... 137/602 |

FOREIGN PATENT DOCUMENTS

| JP | 05-172265 | | 7/1993 |
| JP | 11-159649 | * | 11/1999 |

* cited by examiner

*Primary Examiner*—John Fox
(74) *Attorney, Agent, or Firm*—Armstrong, Kratz, Quintos, Hanson & Brooks, LLP (57) ABSTRACT

A connecting layer for interconnecting fluid control devices in series and in parallel comprises an upper connecting layer 4 and a lower connecting layer 5. The upper connecting layer 4 is provided by parallel rows each comprising block couplings 41, 42, 43, 44 arranged longitudinally of the apparatus, each of the block couplings having a longitudinal channel 61 for interconnecting the adjacent fluid control devices in the row and a through channel 62 communicating with the fluid control device. The lower connecting layer 5 is provided by block coupling 56, 57, 58 each having a lateral channel 64 for interconnecting the through channels 62 of the block couplings 41, 42, 43, 44 of the upper connecting layer 4 which are arranged laterally and by block couplings 51 each adapted to cause the through channel 62 of the block coupling 41, 43, 44 of the upper connecting layer 4 to communicate with an inlet-side or outlet-side coupling 52, 53. The couplings 51, 56, 57, 58 of the lower connecting layer 5 are attached to a base plate 2 with screws from above, and the couplings 41, 42, 43, 44 of the upper connecting layer 4 are attached to the couplings 51, 56, 57, 58 of the lower connecting layer 5 with screws form above.

2 Claims, 7 Drawing Sheets

FLUID CONTROL APPARATUS

BACKGROUND OF THE INVENTION

The present invention relates to fluid control apparatus for use in semiconductor manufacturing equipment, and more particularly to integrated fluid control apparatus which are so assembled that fluid control devices, such as massflow controllers and on-off valves, are connected by block couplings so as to be removable individually singly upward for inspection and maintenance.

Figure 3:
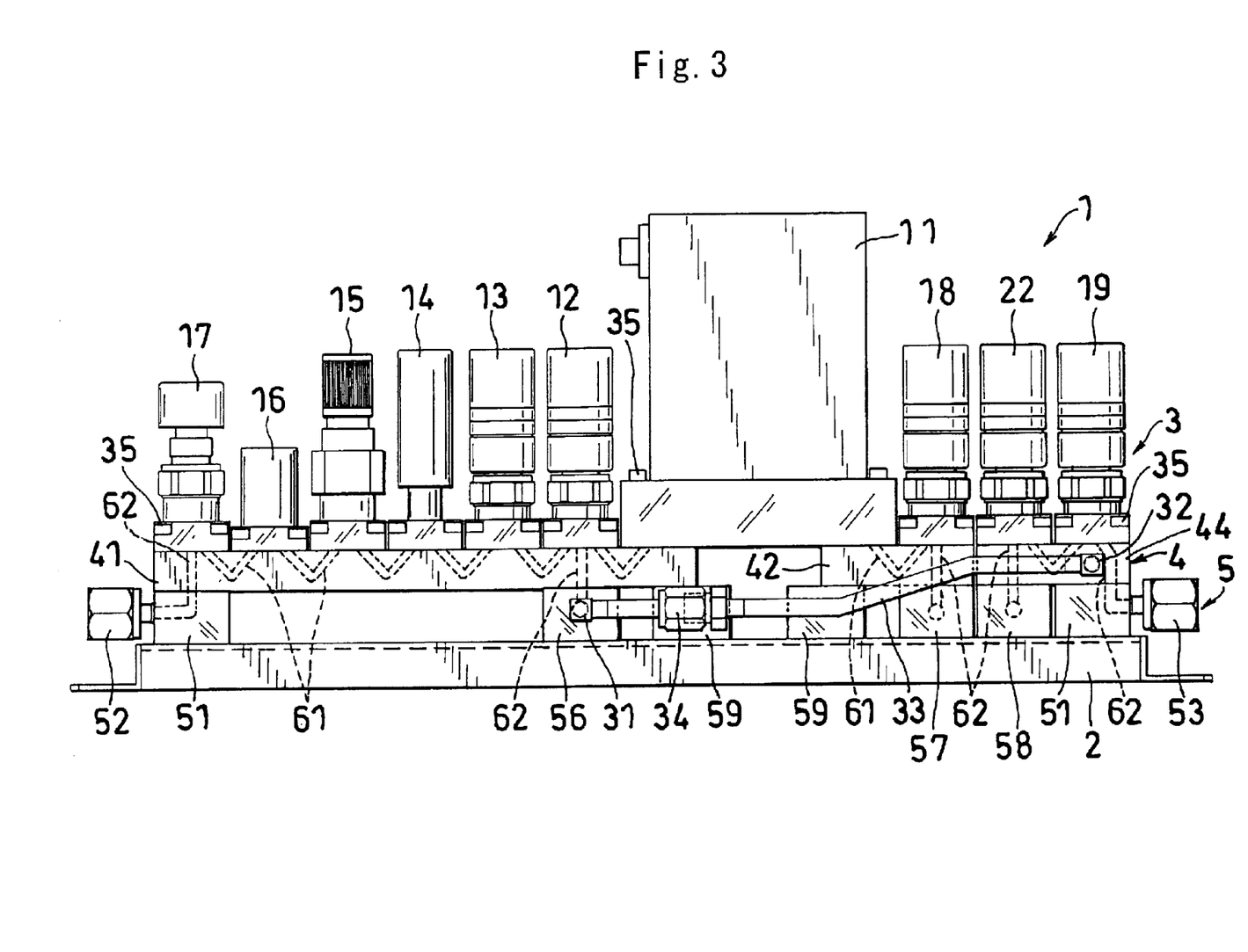
FIG. 3 is a side elevation of the fluid control apparatus of the invention.

The terms "upper" and "lower" as used herein refer respectively to the upper and lower sides of FIG. 3, while these terms are used for the sake of convenience. The fluid control apparatus may be installed on a horizontal surface in the state shown in FIG. 3 or as turned upside down, or on a vertical surface.

Integrated fluid control apparatus of the type mentioned and already known comprise a plurality of lines each comprising a plurality of fluid control devices, and connecting means provided under these lines for connecting the components of each line and interconnecting the lines. The connecting means comprises a longitudinal block coupling having a longitudinal channel and interconnecting the fluid control devices of each line, and a lateral block coupling having a lateral channel and for interconnecting the adjacent lines. Both types of block couplings are arranged on a base plate, connected by screws from horizontal longitudinal directions and attached to the base plate with screws from above. The fluid control devices are fastened to these block couplings with screws from above.

With the conventional fluid control apparatus described, the longitudinal block couplings and the lateral block couplings are connected with screws from horizontal longitudinal directions, so that when the fluid control devices are fastened to the block couplings with screws from above, the devices can not be finely adjusted in position, and a reliable sealing effect is not always available, consequently entailing the problem that the sealing effect becomes impaired owing to deformation or strain when the apparatus is repeatedly disassembled and assembled.

SUMMARY OF THE INVENTION

An object of the present invention is to provide a fluid control apparatus which is easy to disassemble and assemble and which is nevertheless prevented from becoming impaired in sealing effect owing to strain.

The present invention provides a fluid control apparatus comprising a device layer provided by parallel rows each comprising a plurality of fluid control devices arranged in series, and a connecting layer positioned under the device layer, interconnecting the fluid control devices of each of the rows in series and interconnecting the fluid control devices of the adjacent rows in parallel, the fluid control apparatus being characterized in that the connecting layer comprises a lower connecting layer comprising a plurality of block couplings attached to a base plate from above with screws, and an upper connecting layer comprising a plurality of block couplings attached to the block couplings of the lower connecting layer from above with screws, the fluid control devices being attached to the block couplings of the upper connecting layer from above with screws.

The fluid control apparatus of the invention can be assembled by mounting the block couplings of the lower connecting layer on the base plate with screws driven from above, fastening the block couplings of the upper connecting layer to these block couplings of the lower connecting layer from above with screws, and attaching the fluid control devices to the block couplings of the upper connecting layer from above with screws. The apparatus can be disassembled by a procedure reverse to the above. Thus, the apparatus is easy to assemble and disassemble. Moreover, the block couplings of the lower connecting layer and those of the upper connecting layer are not fastened with screws from the horizontal longitudinal direction, so that the fluid control devices can be fastened, as finely adjusted in position, to the block couplings of the upper connecting layer. A reliable sealing effect is therefore available with ease. Additionally, this feature prevents the sealing effect from becoming impaired owing to strain through repeated disassembling and assembling. The fluid control devices of each line are removable and mountable as a unit. This facilitates modification of the apparatus or addition of components thereto.

Preferably, the upper connecting layer is provided by parallel rows each comprising a plurality of block couplings arranged longitudinally of the apparatus, each of the block couplings having a longitudinal channel for interconnecting the adjacent fluid control devices in the row and an upward or downward through channel communicating with the fluid control device at a specified location, and the lower connecting layer is preferably provided by at least one lateral communication block coupling having a lateral channel for interconnecting the through channels of the block couplings of the upper connecting layer which are arranged laterally and by inlet-side and outlet-side communication block couplings each adapted to cause the through channel of the block coupling of the upper connecting layer to communicate with an inlet-side or outlet-side coupling for connection to the outside. The channels of the device layer and the upper and lower connecting layers can then be held in communication in longitudinal and lateral directions by a compact arrangement.

According to an embodiment, the device layer has a closing block for closing an upward opening of the block coupling included in the upper connecting layer, while the lower connecting layer has a support block having the same shape as one of the block couplings of the lower connecting layer and having no channel for supporting the block coupling of the upper connecting layer. This serves to reduce the number of different kinds of block couplings constituting the fluid control apparatus.

DESCRIPTION OF THE PREFERRED EMBODIMENT

An embodiment of the present invention will be described below with reference to the drawings.

Figure 1:
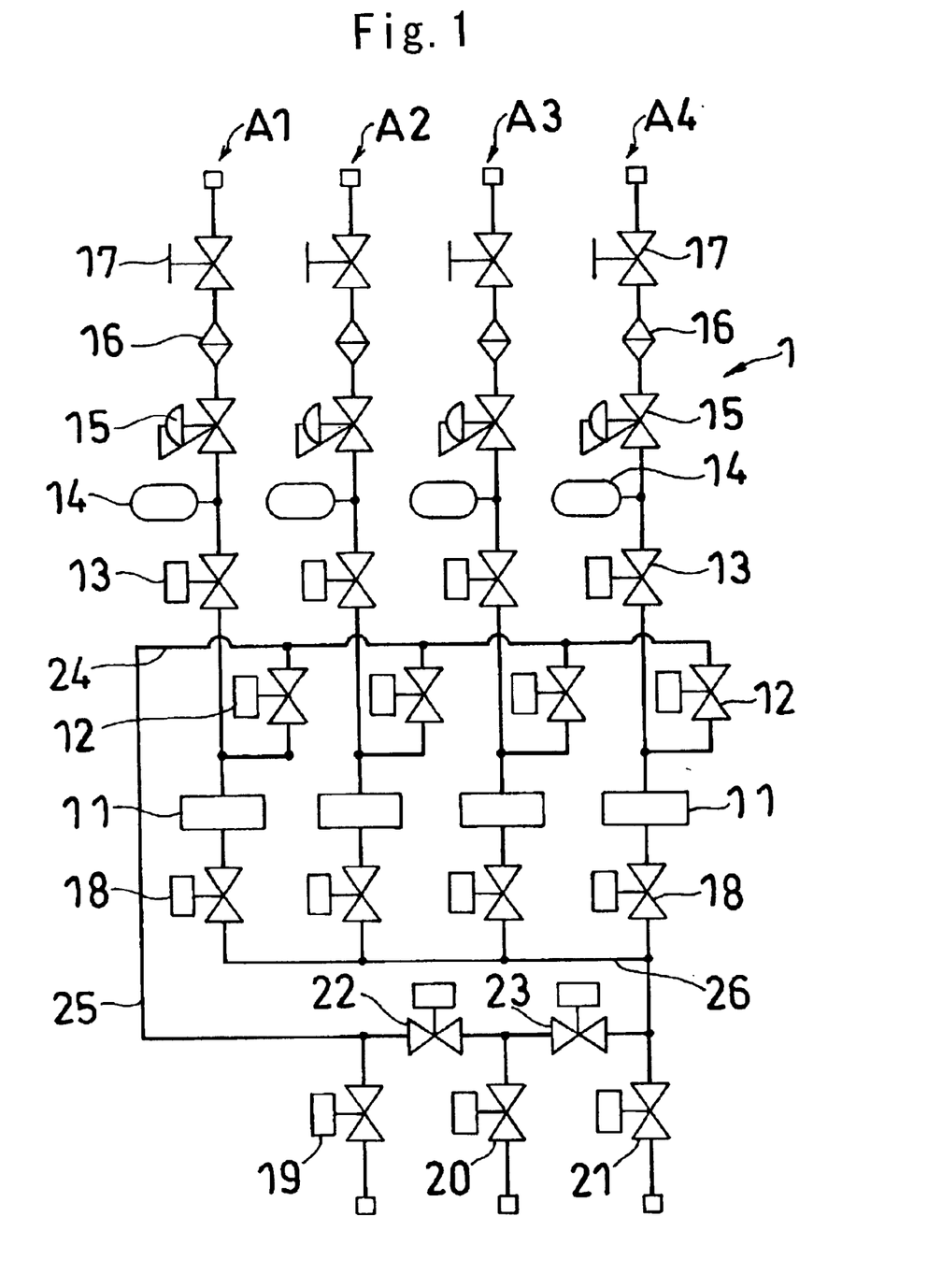
FIG. 1 is a piping diagram showing the construction of a fluid control apparatus of the invention using symbols.

FIG. 1 is a piping diagram (in common for conventional fluid control apparatus) corresponding to a fluid control apparatus of the invention. The fluid control apparatus 1 comprises four lines A1, A2, A3, A4 arranged in parallel.

Each of the lines A1 to A4 is adapted to introduce a purge gas thereinto and comprises a massflow controller 11; an inlet-side first on-off valve 12, inlet-side second on-off valve 13, pressure sensor 14, pressure regulator 15, filter 16 and inlet-side third on-off valve 17 which are arranged at the inlet side of the massflow controller 11; and an outlet-side on-off valve 18 disposed at the outlet side of the massflow controller 11. The lines A1 to A4 are provided at their outlet side with a purge gas inlet on-off valve 19, purge gas outlet on-off valve 20 and process gas outlet on-off valve 21 which are in common for these lines. A purge gas inlet/outlet changeover on-off valve 22 is interposed between the purge gas inlet on-off valve 19 and the purge gas outlet on-off valve 20, and a purge/process gas changeover on-off valve 23 between the on-off valve 20 and the process gas outlet on-off valve 21. The gas piping indicated in solid lines includes purge gas dividing piping 24, purge gas inlet piping 25 and purge-process gas confluent piping 26.

Figure 2:
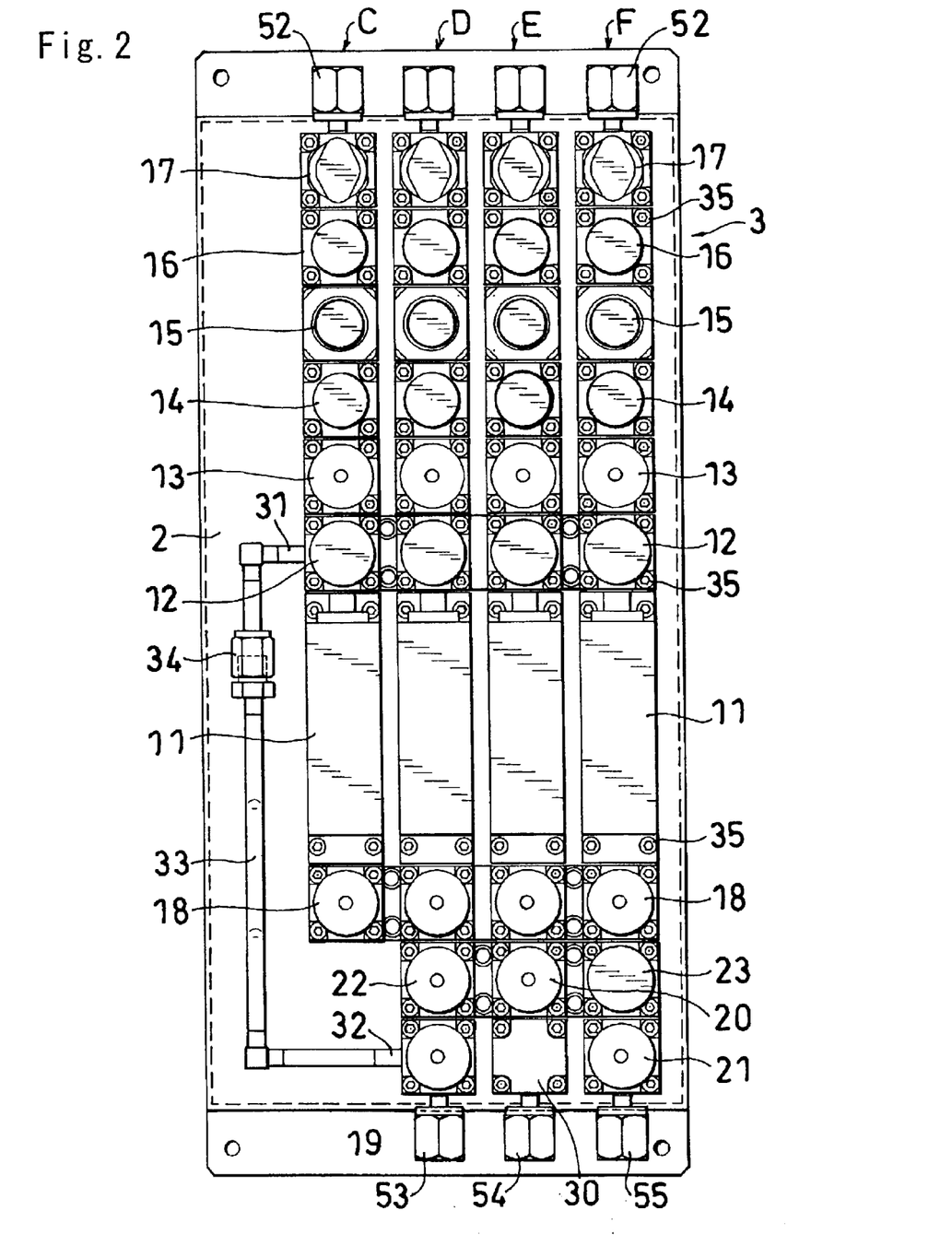
FIG. 2 is a plan view showing a device layer of the fluid control apparatus of the invention.
Figure 4:
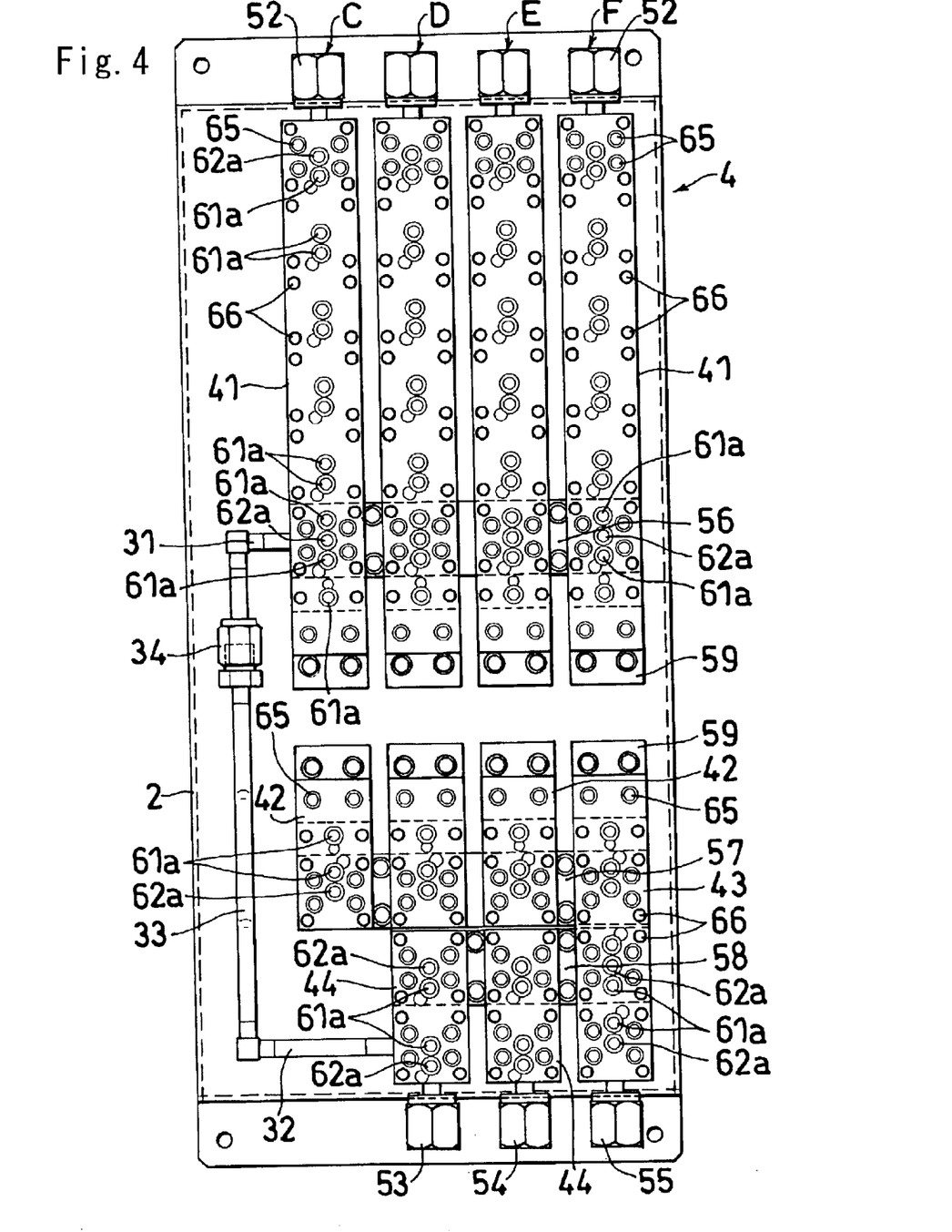
FIG. 4 is a plan view showing an upper connecting layer.
Figure 5:
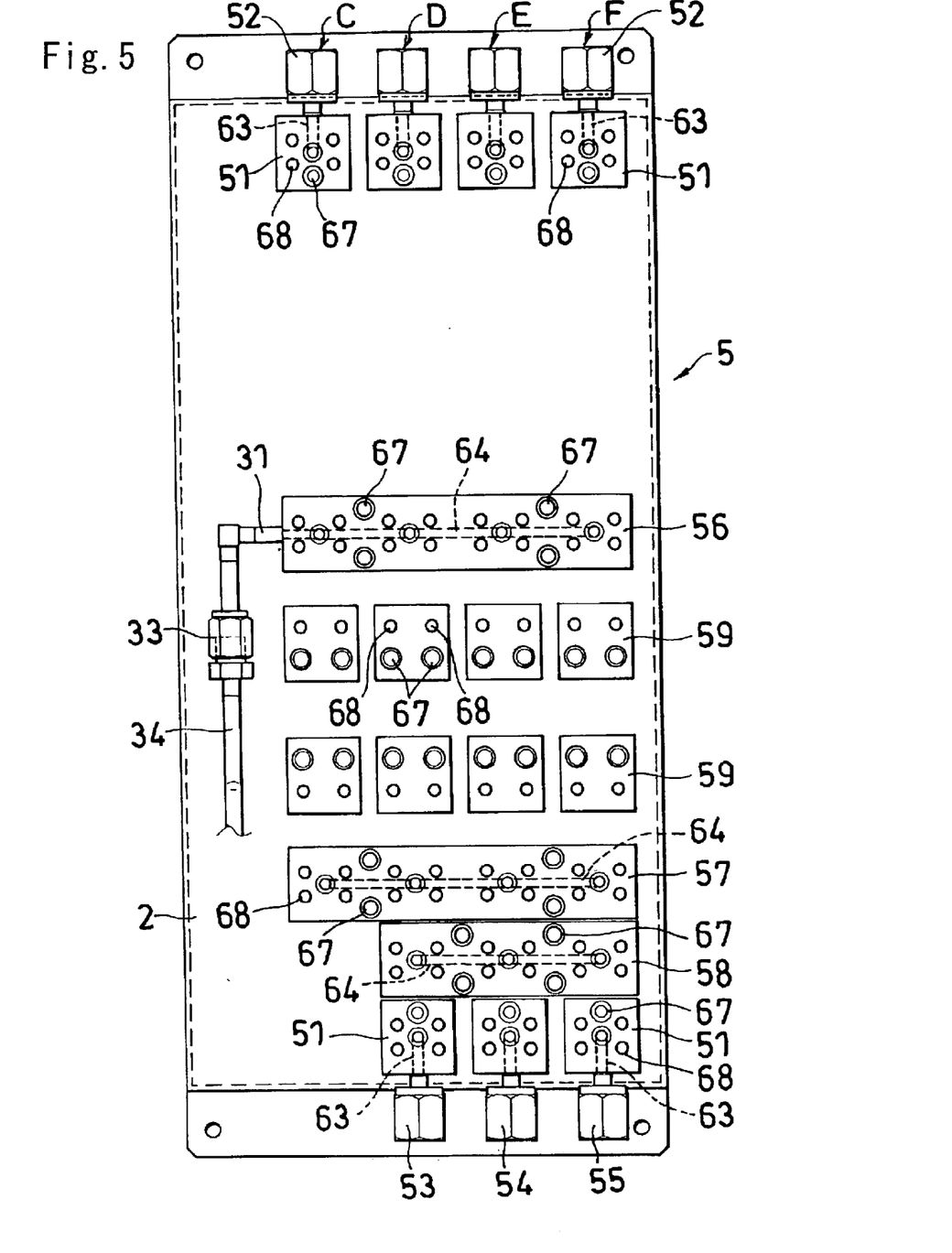
FIG. 5 is a plan view showing a lower connecting layer.

In corresponding relation with the piping diagram of FIG. 1, the fluid control apparatus of the invention has a device layer 3 shown in FIG. 2, and a connecting layer comprising an upper connecting layer 4 shown in FIG. 4 and a lower connecting layer 5 shown in FIG. 5. The device layer 3 is provided by parallel rows each comprising a plurality of fluid control devices 11, 12, 13, 14, 15, 16, 17, 18, 19, 20, 21, 22, 23 arranged in series. The upper connecting layer 4 is provided by parallel rows each comprising a plurality of block couplings 41, 42, 43, 44 arranged longitudinally of the apparatus. The lower connecting layer 5 comprises block couplings 51, 56, 57, 58 mounted on a base plate 2 and connecting the block couplings 41, 42, 43, 44 of the upper connecting layer 4 in accordance with specifications.

The device layer 3 is provided by the plurality of rows, i.e., a row C to a row F, in corresponding relation with the piping diagram of FIG. 1. The row C comprises a massflow controller 11; an inlet-side first on-off valve 12, inlet-side second on-off valve 13, pressure sensor 14, pressure regulator 15, filter 16 and inlet-side third on-off valve 17 which are arranged at the inlet side of the massflow controller 11; and an outlet-side on-off valve 18 disposed at the outlet side of the massflow controller 11. The row D comprises a purge gas inlet on-off valve 19 and a purge gas inlet/outlet changeover on-off valve 22 which are added to the components of the row C. The row E comprises a purge gas outlet on-off valve 20 added to the components of the row C. The row F comprises a process gas outlet on-off valve 21 and a purge/process gas changeover on-off valve 23' which are added to the components of the row C. Provided between the inlet-side first on-off valve 12 of the row C and the purge gas inlet on-off valve 19 of the row D are a coupling 31 joined to the inlet-side lateral communication block coupling 56 of the lower connecting layer 5, a coupling 32 joined to the outlet-side block coupling 44 of the upper connecting layer 4, and piping 33 having a separable coupling 34 and interconnecting the two couplings 31, 32, in corresponding relation with the purge gas inlet piping 25.

The upper connecting layer 4 is provided in corresponding relation with the rows of the device layer 3.

Figure 6:
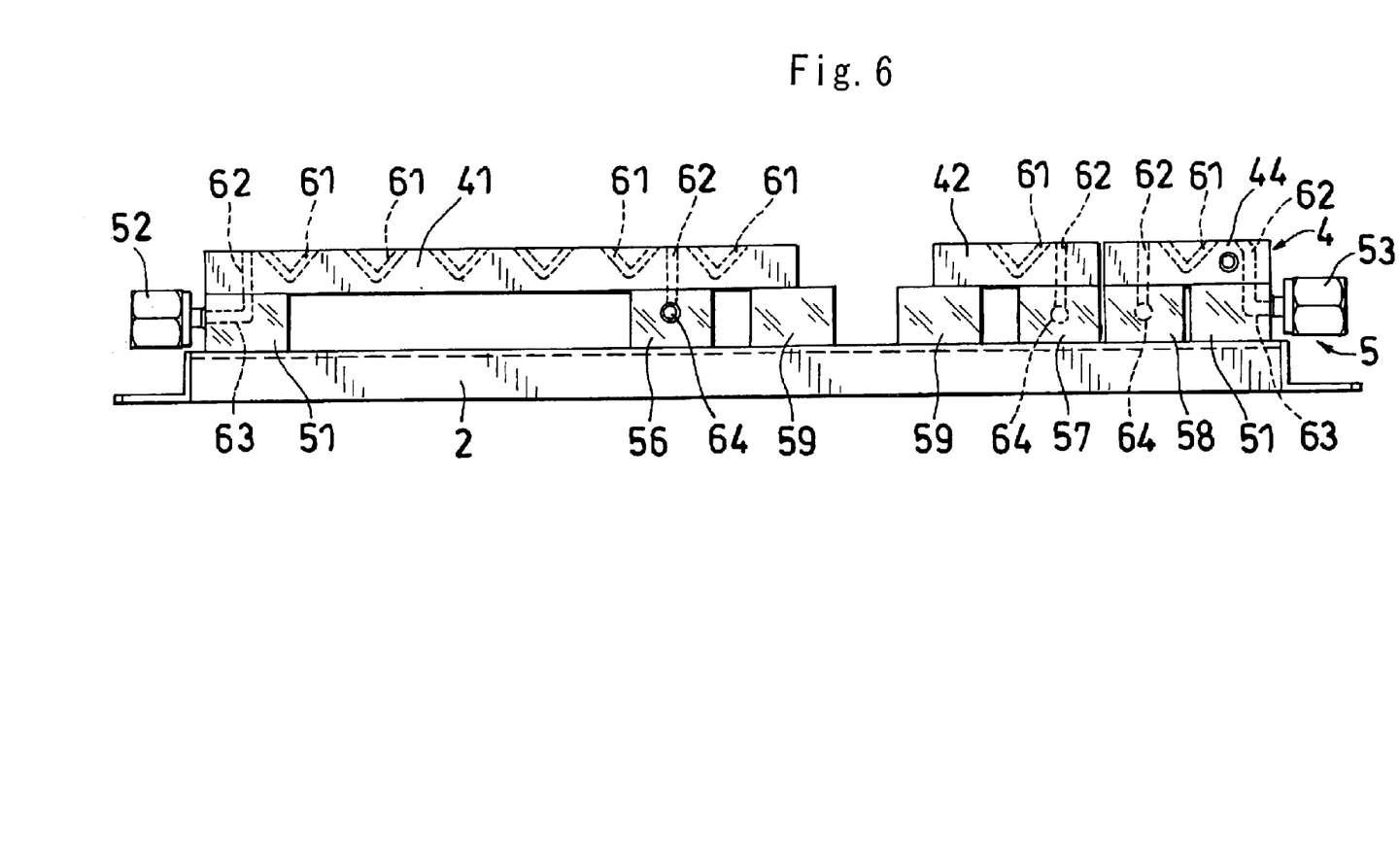
FIG. 6 is a side elevation showing the upper and lower connecting layers.

A row C and a row F each comprise an inlet-side block coupling 41 and an outlet-side block coupling 42. A row D and a row E each comprise an inlet-side block coupling 41 and two outlet-side block couplings 42, 44. The same inlet-side block couplings 41 are used for the rows. The outlet-side block couplings 42, 44 in the rows C, D and E have the same length. The outlet-side block coupling 43 in the row E has twice the length of the block couplings 42, 44. As shown in FIGS. 3 and 6, the block couplings 41, 42, 43, 44 each have one or a required number of V-shaped channels 61 for holding adjacent fluid control devices in communication with each other, and at least one vertical through channel 62. These channels 61, 62 are positioned at the widthwise center of each of the block couplings 41 to 44, as spaced apart by a predetermined distance longitudinally of the block coupling. In FIG. 4, the openings of the V-shaped channels are indicated at 61a, and the openings of the vertical channels 62 are indicated at 62a. The openings 61a, 62a of these channels 61, 62 each have a recessed portion for accommodating a gasket held by a retainer. The outlet-side block coupling 44 in the row E provides a channel for the purge gas outlet on-off valve 20. The opening 61a not in communication with this on-off valve 20 is closed with a closing block 30 of the device layer 3. Among the openings provided on opposite sides of the channels 61 or 62, those 65 indicated by double circles are each a screw insertion bore having a spot facing for a screw (not shown) to be inserted in for use in fastening the block coupling 41, 42, 43 or 44 to the block coupling 51, 56, 57 or 58 of the lower connecting layer 5. The openings 66 indicated by small single circles are each an internally threaded bore for the screw 35 to be driven in from above in fastening one of the fluid control devices 11 to 23.

The lower connecting layer 5 comprises in combination inlet-side communication block couplings 51 connected to inlet-side couplings 52, outlet-side communication block couplings 51 connected to respective outlet-side couplings 53, 54, 55, and laterally elongated lateral communication block couplings 56, 57, 58 provided between the couplings 51 at opposite sides. The inlet-side couplings 52 and the outlet-side couplings 53, 54, 55 are for use in connection to outside. Four inlet-side couplings 52 are used which correspond in number to the number of lines A1 to A4. Three outlet-side couplings are used which are a purge gas inlet coupling 53, purge gas outlet coupling 54 and process gas outlet coupling 55. The lower connecting layer 5 further includes support blocks 59 having no channel but the same size as the inlet- and outlet-side communication blocks 51 and adapted to support the block couplings 41, 42, 43, 44 of the upper connecting layer 4.

With reference to FIGS. 3 and 6, the inlet-side and outlet-side communication block couplings 51 of the lower connecting layer 5 each have an L-shaped longitudinal communication channel 63 for holding a vertical through channel 62 formed in an end portion of each of inlet-side and outlet-side block couplings 41, 44 of the upper connecting layer 4 in communication with the inlet-side or outlet-side coupling 52, 53, 54 or 55.

Figure 7A:
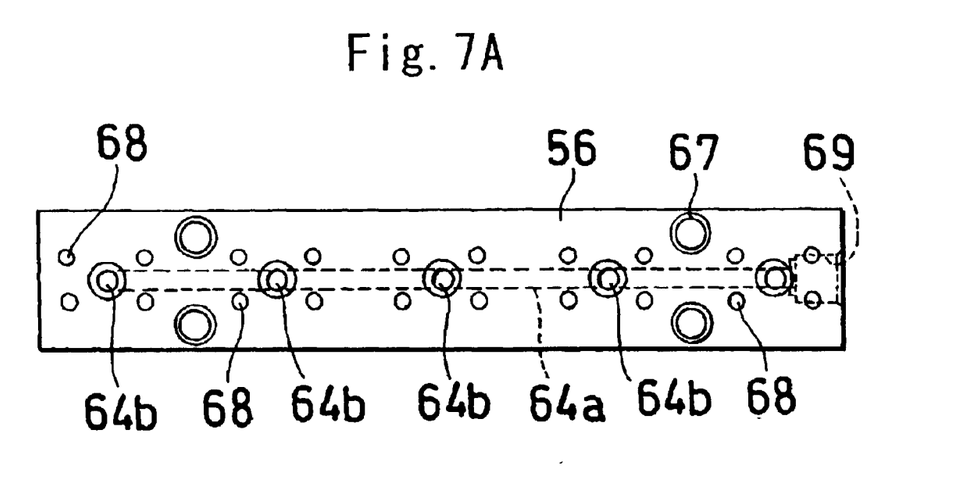
FIG. 7 is a view showing a block coupling for lateral communication.
Figure 7B:
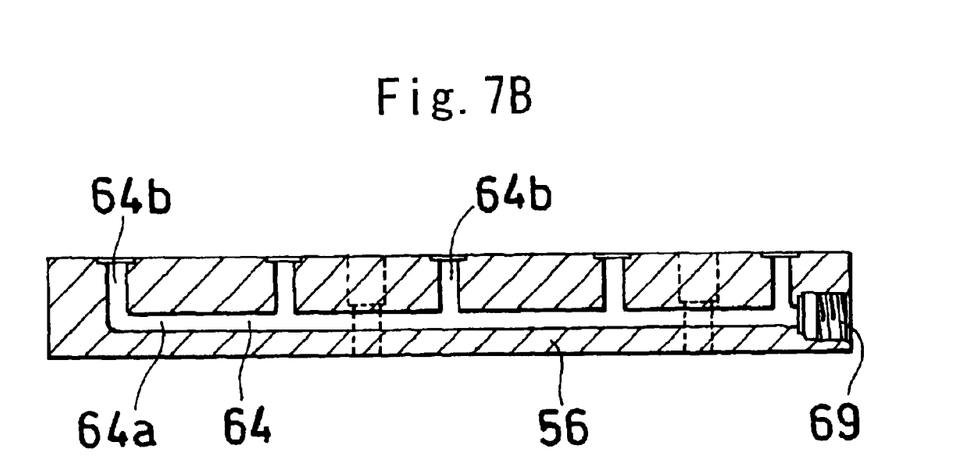

The lateral communication block couplings 56, 57, 58 of the lower connecting layer 5 each have a lateral channel 64 comprising a main channel 64a extending in a lateral direction, and a plurality of subchannels 64b branching out upward from the main channel and opened upward, as illustrated in FIG. 7 which shows an example. Arranged respectively at the inlet side and outlet side of the massflow controller 11 are lateral communication block couplings 56, 57 having a length extending from the row C to the row F. The block coupling 56 at the inlet side of the massflow controller 11 corresponds to the purge gas dividing piping 24 of FIG. 1 and has an opening communicating with the purge gas inlet piping 25. The block coupling 57 at the outlet side of the massflow controller 11 corresponds to the purge-process gas confluent piping 26 of FIG. 1. Disposed between this block coupling 57 and the outlet-side communication block couplings 51 is a lateral communication block 58 having a length extending from the low D to the row F. This block 58 serves to connect the purge gas inlet/outlet changeover on-off valve 22 to the purge/process gas changeover on-off valve 23. The support blocks 59 are arranged at each of the inlet side and outlet side of the massflow controller 11 and correspond in number to the number of rows. The inlet-side block couplings 41 and the outlet-side block couplings 42, 43 of the upper connecting layer 4 are supported, each at the end portion thereof closer to the massflow controller 11, by the support blocks 59.

With reference to FIG. 5, the lateral communication block couplings 56, 57, 58 have lateral communication channels 64 which are all designated by the same reference numeral 64. The inlet-side and outlet-side communication block couplings 51 have longitudinal communication channels which are all designated by the same reference numeral 63. The openings of these channels 63, 64 each have a recessed portion for accommodating a gasket held by a retainer. Among the openings provided on opposite sides of the channels 63, 64, the openings 67 which are indicated by double circles are each a screw insertion bore having a spot facing for a screw to be inserted in for use in fastening the block coupling or the support block 51, 56, 57 or 58 to the base plate 2. The openings 68 indicated by small single circles are each an internally threaded bore for a screw to be driven in from above in fastening the block coupling 41, 42, 43 or 44 of the upper connecting layer 4.

As shown in FIG. 7, one end of each of the lateral communication block couplings 56, 57, 58 is internally threaded as at 69 for use in screwing a coupling thereinto. When required, the coupling (having the same shape as those indicated at 31 and 32) can be screwed into the internally threaded portion 69. If there is no need to attach the coupling, the internally threaded portion 69 is closed with an externally threaded member.

With the fluid control apparatus 1, process gas admitted into the block coupling 51 of the lower connecting layer 5 through the inlet-side coupling 52 of each row flows through the inlet-side fluid control devices 17, 16, 15, 14, 13, 12 of the device layer 3 which are connected by the inlet-side block coupling 41 of the upper connecting layer 4 to reach the mass flow controller 11, has its flow rate adjusted, is passed through the outlet-side fluid control devices of the device layer 3 which include the on-off valve 18 and are connected by the outlet-side block coupling 42 of the upper connecting layer 4, and is discharged toward a process chamber. At this time, the process gas portions through the rows are temporarily collected by the lateral communication block coupling 57 for the confluence of gas. The gas is then passed through the lateral communication block coupling 58 for a changeover and discharged through the process gas outlet on-off valve 21 which is manipulated. Purge gas is admitted via the outlet-side coupling 53 in the row D, passed through the piping 33 and then through the lateral communication block coupling 56 of the lower connecting layer 5, introduced into the row C at the position of the inlet-side first on-off valve 12, thereafter passed through the fluid control devices 12, 11, 18 of the device layer 3 in the same manner as the process gas and discharged. The purge gas is distributed also to the rows D to F by the lateral communication block coupling 56 of the lower connecting layer 5, is passed through the massflow controllers 11, thereafter flows into the lateral communication block coupling 57 for confluence, then flows through the lateral communication block coupling 58 for a changeover and is discharged through the purge gas outlet on-off valve 20 which is manipulated.

The fluid control apparatus of the present invention can be assembled by mounting the block couplings and the support blocks 51, 56, 57, 58, 59 of the lower connecting layer 5 on the base plate 2 with screws driven from above, attaching the block couplings 41, 42, 43, 44 of the upper connecting layer 4 to these block couplings and support blocks 51, 56, 57, 48, 59 of the lower connecting layer 5 from above with screws, and attaching the fluid control devices 11, 12, 13, 14, 15, 16, 17, 18, 19, 20, 21, 22, 23 to the block couplings 41, 42, 43, 44 of the upper connecting layer 4 from above with screws 35. The components can be assembled without using any horizontal screws or without resorting to welding. The apparatus can be disassembled by a procedure reverse to the above. Thus, the apparatus is easy to assemble and disassemble. The lines can be modified or components may be added by removing and mounting the fluid control devices 11 to 23 as one unit of line, while the block couplings 41 to 44 of the upper connecting layer can also be removed and mounted as a unit for each line. Thus the apparatus can be modified with ease.

What is claimed is:

1. A fluid control apparatus comprising a device layer (3) provided by parallel rows each comprising a plurality of fluid control devices (11)(12)(13)(14)(15)(16)(17)(18)(19) (20)(21)(22)(23) arranged in series, and a connecting layer (4)(5) positioned under the device layer, interconnecting the fluid control devices of each of the rows in series and interconnecting the fluid control devices of the adjacent rows in parallel, the fluid control apparatus being characterized in that the connecting layer (4)(5) comprises a lower connecting layer (5) comprising a plurality of block couplings (51)(56)(57)(58) attached to a base plate (2) from above with screws, and an upper connecting layer (4) comprising a plurality of block couplings (41)(42)(43)(44) attached to the block couplings (51)(56)(57)(58) of the lower connecting layer (5) from above with screws, the fluid control devices (11)(12)(13)(14)(15)(16)(17)(18)(19) (20) (21)(22)(23) being attached to the block couplings (41)(42) (43)(44) of the upper connecting layer (4) from above with screws (35); and > wherein the upper connecting layer (4) is provided by parallel rows each comprising a plurality of block couplings (41)(42)(43)(44) arranged longitudinally of the apparatus, each of the block couplings (41)(42)(43) (44) having a longitudinal channel (61) for interconnecting the adjacent fluid control devices in the row and an upward or downward through channel (62) communicating with the fluid control device at a specified location, and the lower connecting layer (5) is provided by at least one lateral communication block coupling (56)(57)(58) having a lateral channel (64) for interconnecting the through channels (62) of the block couplings (41)(42)(43)(44) of the upper connecting layer (4) which are arranged laterally and by inlet-side and outlet-side communication block couplings (51) each adapted to cause the through channel (62) of the block coupling (41)(43)(44) of the upper connecting layer (4) to communicate with an inlet-side or outlet-side coupling (52)(53)(54)(55) for connection to the outside; and > wherein the lower connecting layer (5) has a support block (59) having the same shape as one of the block couplings (51)(56)(57)(58) of the lower connecting layer (5) and having no channel for supporting the block coupling (41)(42)(43) of the upper connecting layer (4).

2. A fluid control apparatus according to claim 1, wherein the device layer (3) has a closing block (30) for closing an upward opening of the block coupling (44) included in the upper connecting layer (4).

* * * * *